US010739505B2

(12) United States Patent
Rong et al.

(10) Patent No.: US 10,739,505 B2
(45) Date of Patent: Aug. 11, 2020

(54) ELECTRONIC APPARATUS

(71) Applicants: K-TRONICS (SUZHOU) TECHNOLOGY CO., LTD., Suzhou (CN); BOE TECHNOLOGY GROUP CO., LTD., Beijing (CN)

(72) Inventors: Qigui Rong, Beijing (CN); Liushuai Zhao, Beijing (CN)

(73) Assignees: K-TRONICS (SUZHOU) TECHNOLOGY CO., LTD., Suzhou, Jiangsu (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/388,212

(22) Filed: Apr. 18, 2019

(65) Prior Publication Data

US 2020/0041710 A1    Feb. 6, 2020

(30) Foreign Application Priority Data

Aug. 2, 2018 (CN) .................... 2018 2 1245026 U

(51) Int. Cl.
*F21V 8/00* (2006.01)
*G02B 6/42* (2006.01)

(52) U.S. Cl.
CPC ......... *G02B 6/0006* (2013.01); *G02B 6/4256* (2013.01)

(58) Field of Classification Search
CPC ........................... G02B 6/0006; G02B 6/4256
See application file for complete search history.

(56) References Cited

U.S. PATENT DOCUMENTS

2015/0028206 A1   1/2015   Kim et al.
2015/0254974 A1   9/2015   Steyer et al.

FOREIGN PATENT DOCUMENTS

| CN | 104347001 A  | 2/2015  |
| CN | 104704745 A  | 6/2015  |
| CN | 205378068 U  | 7/2016  |
| CN | 206557448 U  | 10/2017 |
| CN | 107682089 A  | 2/2018  |
| CN | 208384801 U  | 1/2019  |
| JP | 2001095071 A | 4/2001  |

OTHER PUBLICATIONS

International Search Report and English Translation of Box V of the Written Opinion dated Sep. 26, 2019, received for corresponding PCT Application No. PCT/CN2019/095982, 15 pages.

*Primary Examiner* — Joseph L Williams
(74) *Attorney, Agent, or Firm* — Kinney & Lange, P.A.

(57) ABSTRACT

An electronic apparatus includes: a housing with a signal entrance; an optical fiber with a first end and a second end adjacent the signal entrance; a remote control signal receiver and an indicator light emitter in the housing and adjacent the first end, the indicator light emitter emitting an indicator light signal towards the first end; a light receiver in the housing, adjacent the first end and configured to receive the indicator light signal, which is emitted from the indicator light emitter and reflected back by a barrier at the signal entrance and process the reflected indicator light signal, thereby outputting an electrical signal, the reflected indicator light signal being transmitted back to the first end through the optical fiber and then received by the light receiver; and a signal processing circuit electrically coupled with the light receiver and configured to process the electrical signal, thereby obtaining a control signal.

16 Claims, 3 Drawing Sheets

ELECTRONIC APPARATUS

CROSS-REFERENCE TO RELATED APPLICATION

This application claims priority to Chinese Patent Application No. 201821245026.2, filed with the Chinese Patent Office on Aug. 2, 2018, which is incorporated herein by reference in its entirety.

TECHNICAL FIELD

The present disclosure relates to the field of electronic apparatus technology, and in particular to an electronic apparatus.

BACKGROUND

A front panel of a display device is usually provided with a button, an infrared receiver and an indicator light. The display device can be controlled by the button or a remote control. The indicator light indicates standby state of the display device.

The presence of the button, the infrared receiver and the indicator light in the front panel of the display device results in difficulty of manufacturing the display device, and also affects aesthetics of the display device. Further, it is necessary to connect a mainboard of the display device to the button and the infrared receiver via cables, which increases production failure rate and production cost.

SUMMARY

One embodiment of the present disclosure provides an electronic apparatus including: a housing with a signal entrance for allowing signals to enter or exist; an optical fiber with a first end and a second end which is adjacent the signal entrance; a remote control signal receiver in the housing and adjacent the first end of the optical fiber; wherein the remote control signal receiver is configured to receive a remote control signal that travels through the signal entrance and the optical fiber; an indicator light emitter in the housing and adjacent the first end of the optical fiber; wherein the indicator light emitter is configured to emit an indicator light signal towards the first end of the optical fiber; a light receiver in the housing and adjacent the first end of the optical fiber; wherein the light receiver is configured to receive the indicator light signal, which is emitted from the indicator light emitter and which is reflected back by a barrier at the signal entrance, and process the reflected indicator light signal, thereby outputting an electrical signal; the reflected indicator light signal is transmitted back to the first end of the optical fiber through the optical fiber and then is received by the light receiver; and a signal processing circuit electrically coupled with the light receiver and configured to process the electrical signal output from the light receiver, thereby obtaining a control signal for the electronic apparatus; wherein the remote control signal receiver, the indicator light emitter and the light receiver may be arranged side by side; the remote control signal receiver may be between the indicator light emitter and the light receiver; and the remote control signal receiver is opposite to the first end of the optical fiber.

In one embodiment, the signal processing circuit includes an amplifier; the amplifier is electrically coupled with the light receiver, and is configured to amplify the electrical signal output from the light receiver.

In one embodiment, the indicator light signal is a pulsed light signal; the signal processing circuit includes a DC blocking device; the DC blocking device is electrically coupled with the light receiver and is configured to perform dc blocking to the electrical signal output from the light receiver.

In one embodiment, the signal processing circuit includes a bandwidth filter; the bandwidth filter is electrically coupled with the light receiver, and is configured to filter the electrical signal output from the light receiver.

In one embodiment, the indicator light signal is a pulsed light signal; the electronic apparatus further includes a signal strength determination circuit and a pulse frequency adjustment circuit; an input terminal of the signal strength determination circuit is electrically coupled with the light receiver via the signal processing circuit; an output terminal of the signal strength determination circuit is electrically coupled with an input terminal of the pulse frequency adjustment circuit; and the signal strength determination circuit is configured to determine a strength of a signal output from the signal processing circuit; an output terminal of the pulse frequency adjustment circuit is electrically coupled with the indicator light emitter; the pulse frequency adjustment circuit is configured to adjust a pulse frequency of the indicator light emitter.

In one embodiment, the signal strength determination circuit is an analog-to-digital converter, and the pulse frequency adjustment circuit is a processor chip.

In one embodiment, the remote control signal receiver, the indicator light emitter and the light receiver are arranged side by side; the remote control signal receiver is between the indicator light emitter and the light receiver; and the remote control signal receiver is opposite to the first end of the optical fiber.

In one embodiment, the electronic apparatus further includes a mainboard within the housing; and the remote control signal receiver, the indicator light emitter and the light receiver are disposed on the mainboard.

In one embodiment, the remote control signal receiver is an infrared light receiver.

In one embodiment, the indicator light emitter is an LED lamp.

In one embodiment, the electronic apparatus is a display device.

In one embodiment, the housing includes a front border and the signal entrance includes an opening in the front border.

In one embodiment, the electronic apparatus further includes a transparent cover plate disposed at the housing and covering the opening.

In one embodiment, the electronic apparatus further includes a decoder coupled with the remote control signal receiver.

In one embodiment, the electronic apparatus further includes a barrier mounted at the housing with the barrier movable relative to the signal entrance.

In one embodiment, the signal processing circuit includes an amplifier, a DC blocking device and a bandwidth filter; the amplifier is electrically coupled with the light receiver and configured to amplify the electrical signal output from the light receiver; the DC blocking device is electrically coupled with the light receiver and configured to perform dc blocking to the electrical signal output from the light receiver; the bandwidth filter is electrically coupled with the light receiver and configured to filter the electrical signal output from the light receiver.

Figure 1:
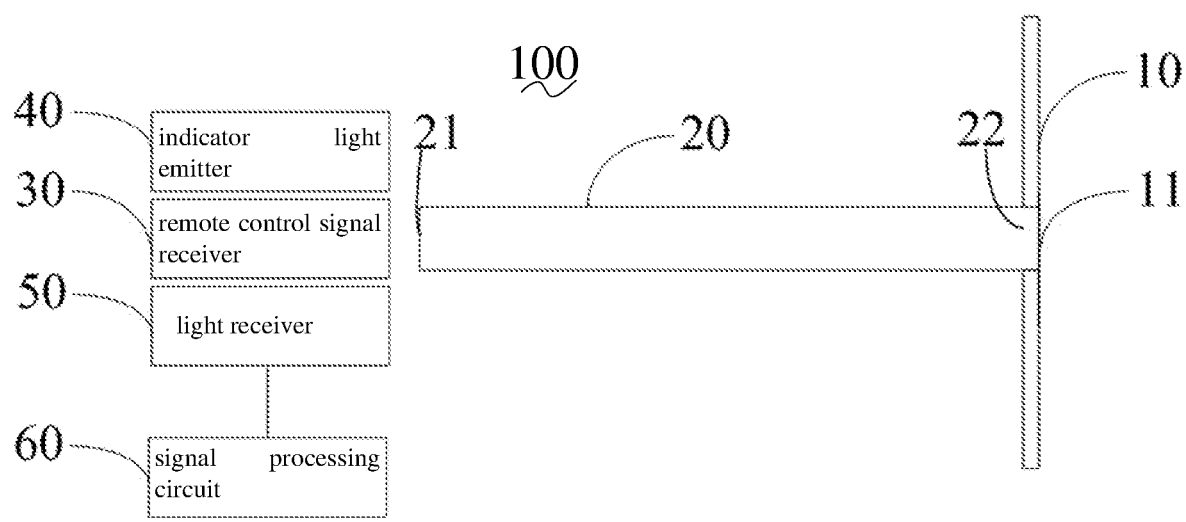
FIG. 1 is a schematic view of an electronic apparatus according to an embodiment of the present disclosure.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise indicated. The following description of exemplary embodiments is merely used to illustrate the present disclosure and is not to be construed as limiting the present disclosure.

Figure 2:
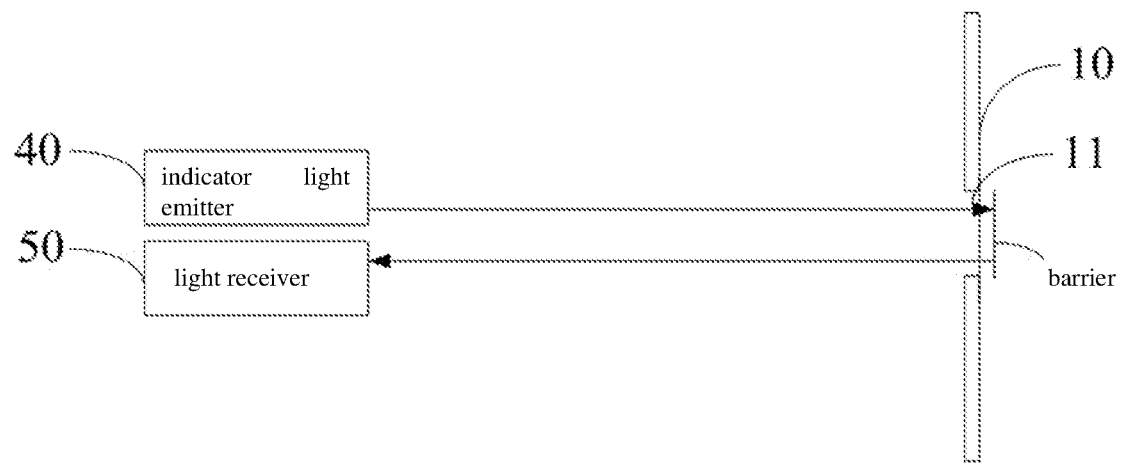
FIG. 2 is a working principle diagram of the electronic apparatus shown in FIG. 1.
Figure 3:
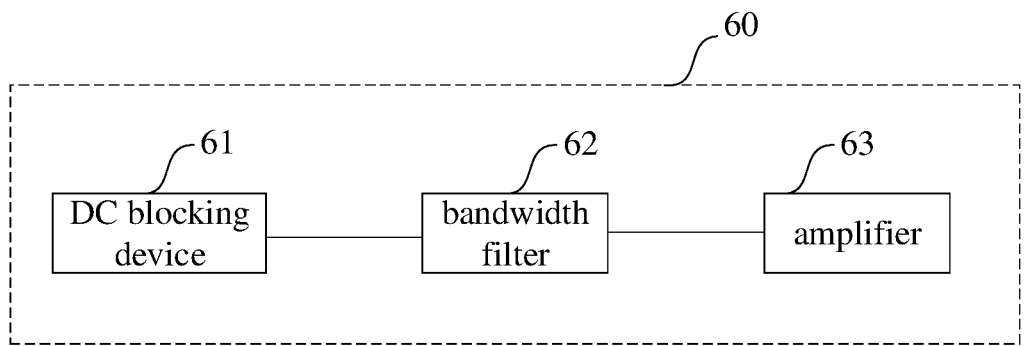
FIG. 3 is a block diagram of a signal processing circuit of the electronic apparatus shown in FIG. 1.
Figure 4:
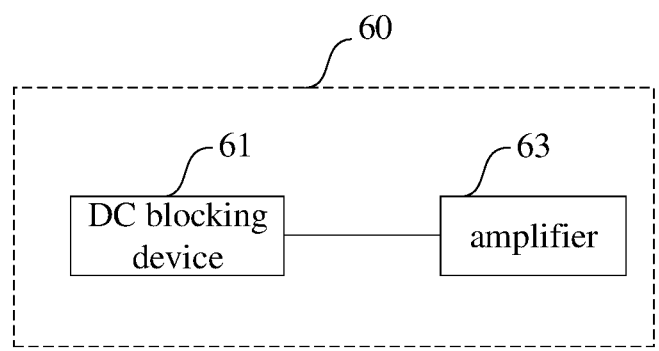
FIG. 4 is a block diagram of another signal processing circuit of the electronic apparatus shown in FIG. 1.
Figure 5:
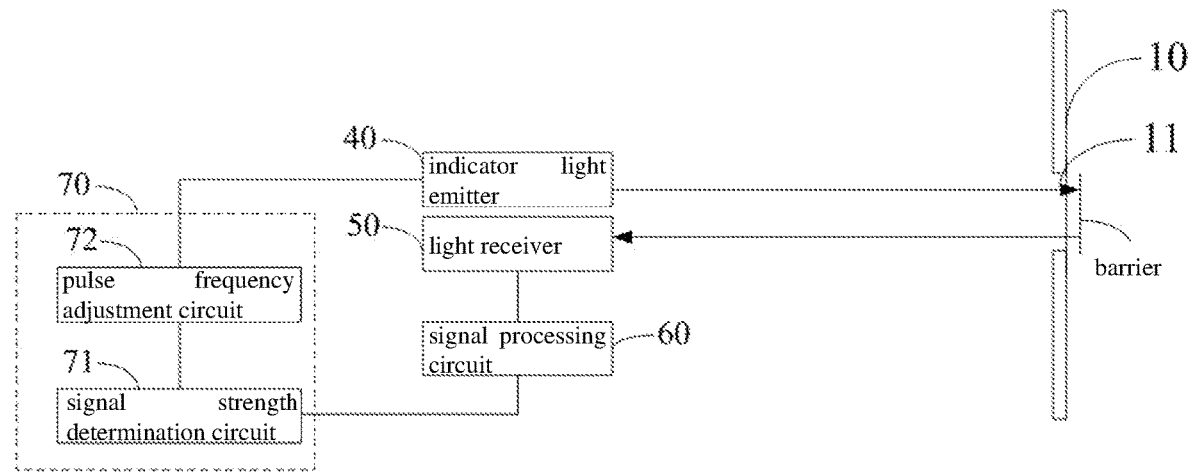
FIG. 5 is a schematic view of another electronic apparatus according to an embodiment of the present disclosure.

FIG. 1 is a schematic view of an electronic apparatus 100 according to an embodiment of the present disclosure. FIG. 2 is a working principle diagram of the electronic apparatus 100 shown in FIG. 1. FIG. 3 is a block diagram of a signal processing circuit of the electronic apparatus 100 shown in FIG. 1. FIG. 4 is a block diagram of another signal processing circuit of the electronic apparatus 100 shown in FIG. 1. FIG. 5 is a block diagram of an electronic apparatus with an automatic calibration circuit according to an embodiment of the present disclosure.

Referring to FIG. 1, the electronic apparatus 100 includes a housing 10, an optical fiber 20, a remote control signal receiver 30, an indicator light emitter 40, a light receiver 50 and a signal processing circuit 60.

The electronic apparatus 100 may be a display device such as a mobile phone, a tablet computer, a television, a note computer, a digital photo-frame, a navigator or any other product or component having displaying functions, or may be a non-display device, such as a refrigerator, and an air conditioner.

Figure 6:
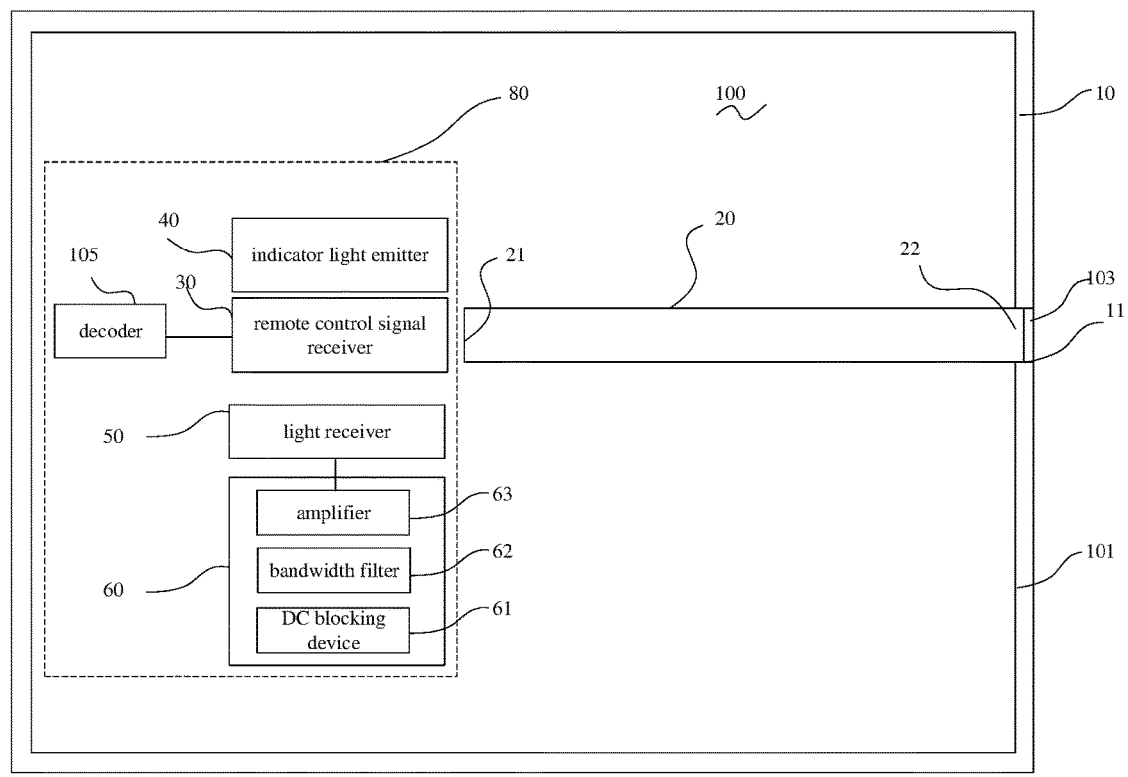
FIG. 6 is a schematic view of an electronic apparatus according to an embodiment of the present disclosure.

The housing 10 is provided with a signal entrance 11 for allowing signals to enter or exist. An external light signal can enter the housing 10 through the signal entrance 11. A light signal emitted in the housing 10 may also emit outside through the signal entrance 11. In one embodiment, the housing 10 is provided with an opening, and the opening is used as the signal entrance 11. For example, the housing 10 of the electrode apparatus such as a display device may include a front border 101 (as shown in FIG. 6), and an opening in the front border can be used as the signal entrance 11. In addition, the housing 10 may be provided with a transparent cover plate 103 (as shown in FIG. 6) at the opening, and the light signal can pass through the transparent cover plate.

The optical fiber 20 has a first end 21 and a second end 22. The second end 22 is adjacent the signal entrance 11. The light signal can propagate in the optical fiber 20 through total reflection, and transmits from an end of the optical fiber 20 to another end of the optical fiber 20. The light signal outside of the housing 10 can pass through the signal entrance 11, then transmits from the second end 22 of the optical fiber 20 to the first end 21. The light signal in the housing 10 may also be transmitted from the first end 21 of the optical fiber 20 to the second end 22, and then emits through the signal entrance 11.

The remote control signal receiver 30 is disposed in the housing 10 and adjacent the first end 21 of the optical fiber 20. The remote control signal receiver 30 is configured to receive a remote control signal such as a light signal that travels through the signal entrance 11 and the optical fiber 20. After the remote control signal receiver 30 receives the remote control signal, a decoder 105 (as shown in FIG. 6) of the electronic apparatus 100 decodes the remote control signal to obtain a control signal. Then, based on the control signal, operations such as changing channels, switching signal sources, powering on or off can be performed, thereby realizing the remote control function of the electronic apparatus 100. In one embodiment, the remote control signal receiver 30 is an infrared light receiver, and the remote control signal is an infrared light signal.

The indicator light emitter 40 is disposed in the housing 10 adjacent the first end 21 of the optical fiber 20. The indicator light emitter 40 is configured to transmit an emitted indicator light signal to the signal entrance 11 through the optical fiber 20. The indicator light signal emitted from the indicator light emitter 40 may be a visible light signal for indicating a state of the electronic apparatus 100, for example, indicating a working state of the electronic apparatus 100. In other words, when the electronic apparatus 100 is in a working state, the indicator light emitter 40 emits the indicator light signal; while when the electronic apparatus 100 is in a non-working state such as standby state, the indicator light emitter 40 does not emit the indicator light signal. Or, the indicator light emitter 40 may emit indicator light signals of different colors for indicating different states of the electronic apparatus 100. For example, a green indicator light signal indicates a working state of the electronic apparatus 100, a red indicator light signal indicates a standby state of the electronic apparatus 100. In one embodiment, the indicator light emitter 40 may be an LED lamp.

The light receiver 50 is disposed in the housing 10 and adjacent the first end 21 of the optical fiber 20. The light receiver 50 is configured to receive the indicator light signal, which is emitted from the indicator light emitter 40 and which is reflected back by a barrier at the signal entrance 11. Then the light receiver 50 is configured to process the reflected indicator light signal, thereby outputting an electrical signal. The reflected indicator light signal is transmitted back to the first end 21 of the optical fiber 20 through the optical fiber 20, and then is received by the light receiver 50. As shown in FIG. 2, when the signal entrance 11 is covered by the barrier, the indicator light signal emitted from the indicator light emitter 40 is transmitted to the signal entrance 11 through the optical fiber 20, then is reflected by the barrier and then is received by the light receiver 50 through the optical fiber 20. Lines with arrows in FIG. 2 only indicate transmission directions of the indicator light signal. In actual application, the indicator light signals propagate in different directions along the same path in optical fiber 20. The barrier may be, for example, a user's finger or other blocking structures. The indicator light signal cannot pass through the user's finger or other blocking structures, then the indicator light signal transmitted to the signal entrance 11 is reflected. The light receiver 50 may be a photosensitive device.

The remote control signal receiver 30, the indicator light emitter 40 and the light receiver 50 may be arranged side by side. The remote control signal receiver 30 may be between the indicator light emitter 40 and the light receiver 50. The remote control signal receiver 30 is opposite to the first end 21 of the optical fiber 20. By arranging the remote control signal receiver 30 between the indicator light emitter 40 and the light receiver 50, it is able to prevent the indicator light signal emitted by the indicator light emitter 40 from being directly irradiated onto the light receiver 50 which may cause the light receiver 50 to generate an interference signal. A distance between the first end 21 of the optical fiber 20 and the remote control signal receiver 30 may be adjusted, so that strong light signals in the indicator light signal emitted by the light transmitter 40 are incident to the first end 21 of the optical fiber 20 and most of light signals emitted from the first end 21 of the optical fiber 20 can be received by the light receiver 50.

In one embodiment, the remote control signal receiver 30, the indicator light emitter 40 and the light receiver 50 may be disposed on a mainboard 80 (as shown in FIG. 6) in the electronic apparatus 100. Then, there is no need to connect the mainboard to the remote control signal receiver 30, the indicator light emitter 40 and the light receiver 50 via cables, thereby reducing cables within the electronic apparatus 100 and then reducing production failure rate and costs.

The signal processing circuit 60 is electrically coupled with the light receiver 50, and is configured to process the electrical signal output from the light receiver 50 so as to obtain a control signal for the electronic apparatus 100. In one embodiment, the light receiver 50 may obtain different electrical signals based on duration of the continuously received indicator light signals, and the signal processing circuit 60 can obtain different control signals based on the different electrical signals output from the light receiver 50, thereby enabling the electronic apparatus 100 to perform corresponding operations based on the different control signals.

For example, when a duration in which the barrier blocks the signal entrance 11 is less than one second, a duration in which the light receiver 50 continuously receives the indicator light signal is less than one second. Then, the signal processing circuit process the electrical signal output from the light receiver 50, thereby obtaining a control signal for changing channels. When a duration in which the barrier blocks the signal entrance 11 is about one second, a duration in which the light receiver 50 continuously receives the indicator light signal is about one second. Then, the signal processing circuit process the electrical signal output from the light receiver 50, thereby obtaining a control signal for switching signal sources. When a duration in which the barrier blocks the signal entrance 11 is greater than one second, a duration in which the light receiver 50 continuously receives the indicator light signal is greater than one second. Then, the signal processing circuit process the electrical signal output from the light receiver 50, thereby obtaining a control signal for powering on or off.

Referring to FIG. 3 and FIG. 4, the signal processing circuit 60 includes an amplifier 63. The amplifier 63 is electrically coupled with the light receiver 50, and is configured to amplify the electrical signal output from the light receiver 50. The amplifier 63 may be directly electrically coupled with the light receiver 50 (as shown in FIG. 6), or indirectly electrically coupled with the light receiver 50 via other circuits. The amplifier 63 can amplify the electrical signal output from the light receiver 50, thereby increasing the strength of the signal output from the signal processing circuit 60 and then improving reaction sensitivity of the electronic apparatus 100.

The indicator light signal emitted from the indicator light emitter 40 may be a pulsed light signal. The signal processing circuit 60 further includes a DC blocking device 61. The DC blocking device 61 is electrically coupled with the light receiver 50 and is configured to perform dc blocking to the electrical signal output from the light receiver 50. The DC blocking device 61 may be directly electrically coupled with the light receiver 50, or indirectly electrically coupled with the light receiver 50 via other circuits.

The light receiver 50 processes the received indicator light signal and then outputs an alternating current signal. An ambient light signal may also enter the housing 10 through signal entrance 11, and then is received by the light receiver 50 through the optical fiber 20. The light receiver 50 processes the received ambient light and then outputs a direct current signal. The DC blocking device 61 performs dc blocking to the electrical signal output from the light receiver 50, thereby filtering out the direct current signal and allowing the alternating current signal to pass through. In this way, it can avoid interference of the incident ambient light to the electrical signal output from the light receiver 50, thereby preventing the electronic apparatus 100 from being affected by the ambient light and then improving accuracy of control of the electronic apparatus 100.

The signal processing circuit 60 further includes a bandwidth filter 62. The bandwidth filter 62 is electrically coupled with the light receiver 50, and is configured to filter the electrical signal output from the light receiver 50. The bandwidth filter 62 may be directly electrically coupled with the light receiver 50, or indirectly electrically coupled with the light receiver 50 via other circuits. The frequency of the indicator light signal emitted by the indicator light emitter 40 may be set to be different from the frequency of the remote control signal. The signal processing circuit 60 further includes a bandwidth filter 62. The bandwidth filter 62 filters the electrical signal output from the light receiver 50, thereby filtering out an electrical signal generated by the light receiver 50 based on the received remote control signal and then avoiding interference caused by the remote control signal and further improving accuracy of control of the electronic apparatus 100. In other embodiments, when the remote control signal is an infrared signal, the light receiver 50 may be a photosensitive device that inhibits infrared light, and does not sense the remote control signal, and then the signal processing circuit 60 may omit the bandwidth filter 62 (as shown in FIG. 4).

In one embodiment, when the signal processing circuit 60 includes the DC blocking device 61, the bandwidth filter 62 and the amplifier 63, as shown in FIG. 3, the bandwidth filter 62 may be electrically coupled with the DC blocking device 61 and the amplifier 63, respectively. The bandwidth filter 62 or the amplifier 63 may be directly coupled with the light receiver 50.

The connection relationship among the signal processing circuit 60 includes the DC blocking device 61, the bandwidth filter 62 and the amplifier 63 are not limited to those shown in FIG. 3. For example, in other embodiments, the DC blocking device 61 may be electrically coupled with the bandwidth filter 62 and the amplifier 63, respectively. The bandwidth filter 62 or the amplifier 63 may be directly coupled with the light receiver 50. In other embodiments, the amplifier 63 may be electrically coupled with the DC blocking device 61 and the bandwidth filter 62, respectively; the DC blocking device 61 or the bandwidth filter 62 may be directly coupled with the light receiver 50.

In one embodiment, when the signal processing circuit 60 includes the DC blocking device 61 and the amplifier 63, as shown in FIG. 4, the DC blocking device 61 may be electrically coupled with and the amplifier 63. The DC blocking device 61 or the amplifier 63 may be directly coupled with the light receiver 50.

Referring to FIG. 5, the electronic apparatus 100 further includes an automatic calibration circuit 70. The automatic calibration circuit 70 includes a signal strength determination circuit 71 and a pulse frequency adjustment circuit 72. An input terminal of the signal strength determination circuit 71 is electrically coupled with the light receiver 50 via the signal processing circuit 60. An output terminal of the signal strength determination circuit 71 is electrically coupled with an input terminal of the pulse frequency adjustment circuit 72. The signal strength determination circuit 71 is configured to determine a strength of the signal output from the signal processing circuit 60. An output terminal of the pulse frequency adjustment circuit 72 is electrically coupled with the indicator light emitter 40. The pulse frequency adjustment circuit 72 is configured to adjust a pulse frequency of the indicator light emitter 40.

Specifically, when the signal strength determination circuit 71 determines that the strength of the signal output from the signal processing circuit 60 is less than a threshold value, the pulse frequency adjustment circuit 72 may adjust the pulse frequency of the indicator light emitter 40. In one embodiment, the signal strength determination circuit 71 may be an analog-to-digital converter (ADC), and the pulse frequency adjustment circuit 72 may be a processor chip. The processor chip adjusts the pulse frequency of the indicator light emitter 40 adjusting PWM frequency.

The electronic apparatus 100 can ensure brightness stability of the indicator light signal by controlling the pulse frequency of the indicator light signal emitted by the indicator light emitter 40, thereby enabling the strength of the signal output from the signal processing circuit 60 to be stable. However, the assembly error in the production process, the error of the indicator light emitter 40 and the errors of the DC blocking device 61, the bandwidth filter 62 and the amplifier 63, may cause a large error in the signal output from the signal processing circuit 60. The electronic apparatus 100 can use the automatic calibration circuit 70 to perform automatic calibration, thereby ensuring stability of the strength of the signal output from the signal processing circuit 60.

The electronic apparatus 100 can use the automatic calibration circuit 70 to adjust the pulse frequency of the indicator light emitter 40 in the following way. The indicator light signal emitted from the indicator light emitter 40 is transmitted to the signal entrance 11 through the optical fiber 20, then is reflected by the barrier at the signal entrance 11 and then is received by the light receiver 50 through the optical fiber 20. The electrical signal output from the light receiver 50 is first processed by the signal processing circuit 60 and then output. The signal strength determination circuit 71 detects the strength of the electrical signal output from the signal processing circuit 60. When the strength of the electrical signal output from the signal processing circuit 60 reaches a specified value, then the pulse frequency adjustment circuit 72 stops adjusting the pulse frequency of the indicator light emitter 40. When the strength of the electrical signal output from the signal processing circuit 60 does not reach the specified value, the pulse frequency adjustment circuit 72 adjusts the pulse frequency of the indicator light emitter 40 until the signal strength determination circuit 71 determines that the strength of the electrical signal output from the signal processing circuit 60 reaches a specified value.

The electronic apparatus 100 can use the signal strength determination circuit 71 and the pulse frequency adjustment circuit 72 to perform automatic calibration, thereby ensuring stability of the strength of the electrical signal output from the signal processing circuit 60 when the signal entrance 11 is covered by the barrier. When the electronic apparatus 100 performs automatic calibration, the barrier at the signal entrance 11 may be a cover that is controlled to move relative to the housing of the electronic apparatus 100 (for example, a cover is controlled by a process on a mainboard of the electronic apparatus to move back and forth relative to the signal entrance 11, thereby covering to exposing the signal entrance 11). The barrier at the signal entrance 11 may also be a cover disposed by a user.

Beneficial effects of the embodiments of the present disclosure include the following:

In the electronic apparatus 100 of the embodiments of the present disclosure, the first end 21 of the optical fiber 20 is adjacent the remote control signal receiver 30, the indicator light emitter 40 and the light receiver 50, and the second end 22 is adjacent the signal entrance 11. The remote control signal entering from the signal entrance 11 may be transmitted to the remote control signal receiver 30 through the optical fiber 20, thereby realizing the remote control function of the electronic apparatus 100. The indicator light signal emitted from the indicator light emitter 40 may be transmitted to the signal entrance 11 through the optical fiber 20, thereby realizing the indication function of the electronic apparatus 100. When the signal entrance 11 is covered by the user, the indicator light signal transmitted to the signal entrance 11 is reflected by the barrier at the signal entrance 11 and then is received by the light receiver 50 through the optical fiber 20. The light receiver 50 receives and processes the reflected indicator light signal, and then outputs the electrical signal. Then, the signal processing circuit 60 processes the electrical signal output from the light receiver 50, thereby obtaining the control signal for the electronic apparatus 100 and then realizing controlling function of the electronic apparatus 100. In the electronic apparatus 100, the optical fiber 20, the remote control signal receiver 30, the indicator light emitter 40 and the light receiver 50 are disposed within the housing 10 of the electronic apparatus 100, thereby simplifying the structure of the housing 10, reducing production difficulty and reducing cables between the housing 10 and the mainboard.

The above are merely the preferred embodiments of the present disclosure and shall not be used to limit the scope of the present disclosure. It should be noted that, a person skilled in the art may make improvements and modifications without departing from the principle of the present disclosure, and these improvements and modifications shall also fall within the scope of the present disclosure.

The invention claimed is:

1. An electronic apparatus comprising:
a housing with a signal entrance configured to permit signals to enter or exist;
an optical fiber with a first end and a second end which is adjacent the signal entrance;
a remote control signal receiver in the housing and adjacent the first end of the optical fiber; wherein the remote control signal receiver is configured to receive a remote control signal that travels through the signal entrance and the optical fiber;
an indicator light emitter in the housing and adjacent the first end of the optical fiber; wherein the indicator light emitter is configured to emit an indicator light signal towards the first end of the optical fiber;
a light receiver in the housing and adjacent the first end of the optical fiber; wherein the light receiver is configured to receive the indicator light signal, which is emitted from the indicator light emitter and which is reflected back by a barrier at the signal entrance, and process the reflected indicator light signal, thereby outputting an electrical signal; the reflected indicator light signal is transmitted back to the first end of the optical fiber through the optical fiber and then is received by the light receiver; and
a signal processing circuit electrically coupled with the light receiver and configured to process the electrical signal output from the light receiver, thereby obtaining a control signal for the electronic apparatus;
wherein:
the remote control signal receiver , the indicator light emitter and the light receiver are arranged side by side;
the remote control signal receiver is arranged between the indicator light emitter and the light receiver; and
the remote control signal receiver is arranged opposite to the first end of the optical fiber.

2. The electronic apparatus of claim 1, wherein the signal processing circuit includes an amplifier; the amplifier is electrically coupled with the light receiver, and is configured to amplify the electrical signal output from the light receiver.

3. The electronic apparatus of claim 1, wherein the indicator light signal is a pulsed light signal; the signal processing circuit includes a DC blocking device; the DC blocking device is electrically coupled with the light receiver and is configured to perform dc blocking to the electrical signal output from the light receiver.

4. The electronic apparatus of claim 1, wherein the signal processing circuit includes a bandwidth filter; the bandwidth filter is electrically coupled with the light receiver, and is configured to filter the electrical signal output from the light receiver.

5. The electronic apparatus of claim 1, wherein the indicator light signal is a pulsed light signal;
the electronic apparatus further includes a signal strength determination circuit and a pulse frequency adjustment circuit;
an input terminal of the signal strength determination circuit is electrically coupled with the light receiver via the signal processing circuit; an output terminal of the signal strength determination circuit is electrically coupled with an input terminal of the pulse frequency adjustment circuit; and the signal strength determination circuit is configured to determine a strength of a signal output from the signal processing circuit; and
an output terminal of the pulse frequency adjustment circuit is electrically coupled with the indicator light emitter; the pulse frequency adjustment circuit is configured to adjust a pulse frequency of the indicator light emitter.

6. The electronic apparatus of claim 5, wherein the signal strength determination circuit is an analog-to-digital converter, and the pulse frequency adjustment circuit is a processor chip.

7. The electronic apparatus of claim 1, wherein the remote control signal receiver, the indicator light emitter and the light receiver are arranged side by side; the remote control signal receiver is between the indicator light emitter and the light receiver; and the remote control signal receiver is opposite to the first end of the optical fiber.

8. The electronic apparatus of claim 7, wherein the electronic apparatus further includes a mainboard within the housing; and the remote control signal receiver, the indicator light emitter and the light receiver are disposed on the mainboard.

9. The electronic apparatus of claim 1, wherein the remote control signal receiver is an infrared light receiver.

10. The electronic apparatus of claim 1, wherein the indicator light emitter is an LED lamp.

11. The electronic apparatus of claim 1, wherein the electronic apparatus is a display device.

12. The electronic apparatus of claim 11, wherein the housing includes a front border and the signal entrance includes an opening in the front border.

13. The electronic apparatus of claim 12, wherein the electronic apparatus further includes a transparent cover plate disposed at the housing and covering the opening.

14. The electronic apparatus of claim 12, wherein the electronic apparatus further includes a decoder coupled with the remote control signal receiver.

15. The electronic apparatus of claim 12, wherein the electronic apparatus further includes a barrier mounted at the housing with the barrier movable relative to the signal entrance.

16. The electronic apparatus of claim 12, wherein the signal processing circuit includes an amplifier, a DC blocking device and a bandwidth filter; the amplifier is electrically coupled with the light receiver and configured to amplify the electrical signal output from the light receiver;
the DC blocking device is electrically coupled with the light receiver and configured to perform dc blocking to the electrical signal output from the light receiver; the bandwidth filter is electrically coupled with the light receiver and configured to filter the electrical signal output from the light receiver.

* * * * *